Feb. 4, 1964   C. L. SPORCK   3,120,206
METAL WORKING
Filed March 9, 1959   4 Sheets-Sheet 2
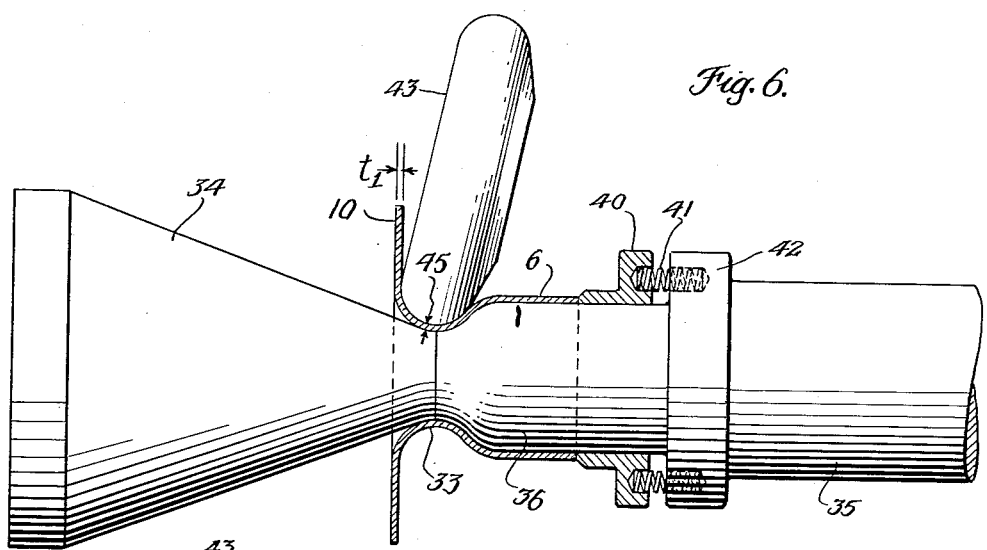
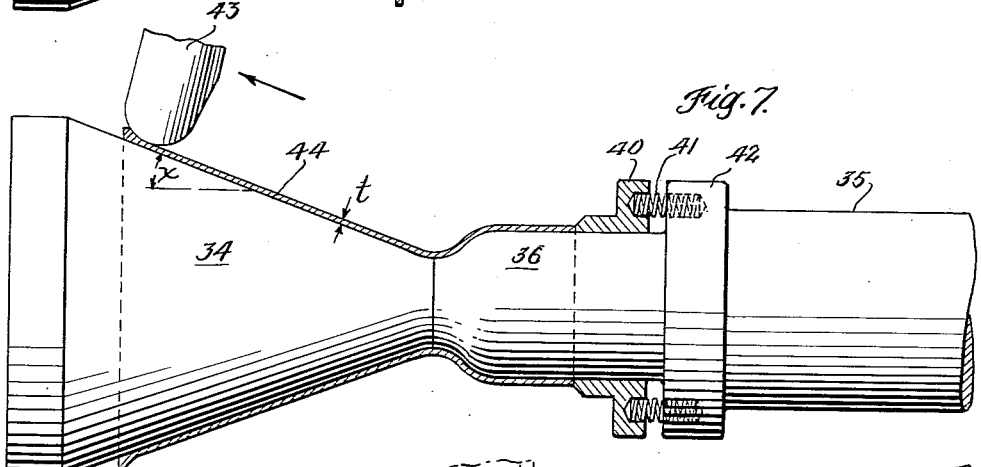
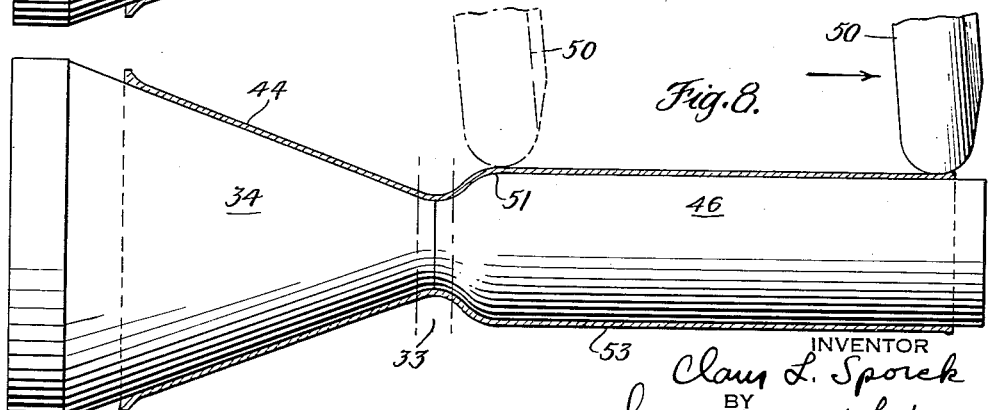
INVENTOR
Claus L. Sporck
BY
Synnestvedt & Lechner
ATTORNEYS Feb. 4, 1964　　　　C. L. SPORCK　　　　3,120,206
METAL WORKING
Filed March 9, 1959　　　　　　　　　　　　　4 Sheets-Sheet 3
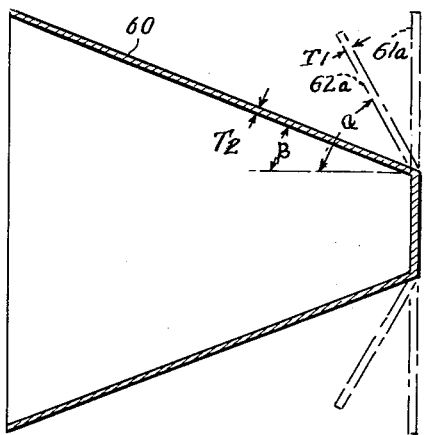
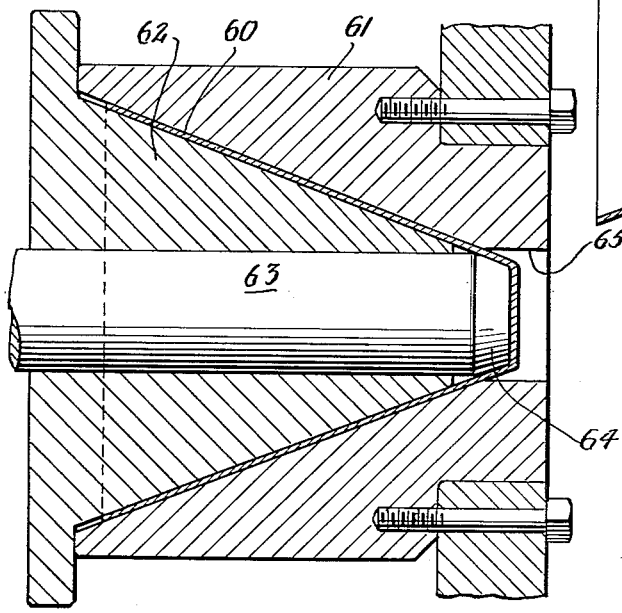
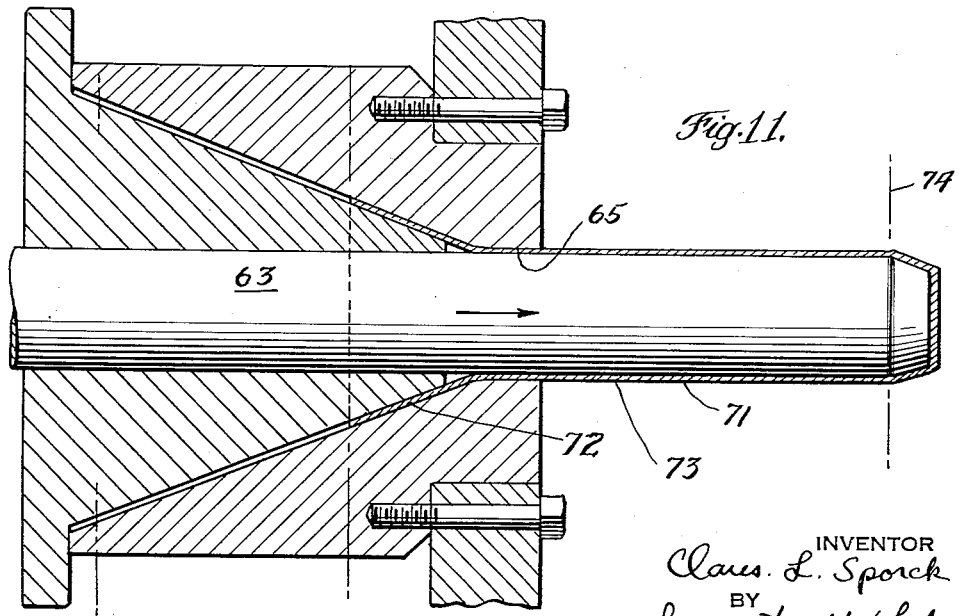
INVENTOR
Claus L. Sporck
BY
Synnestvedt & Lechner
ATTORNEYS

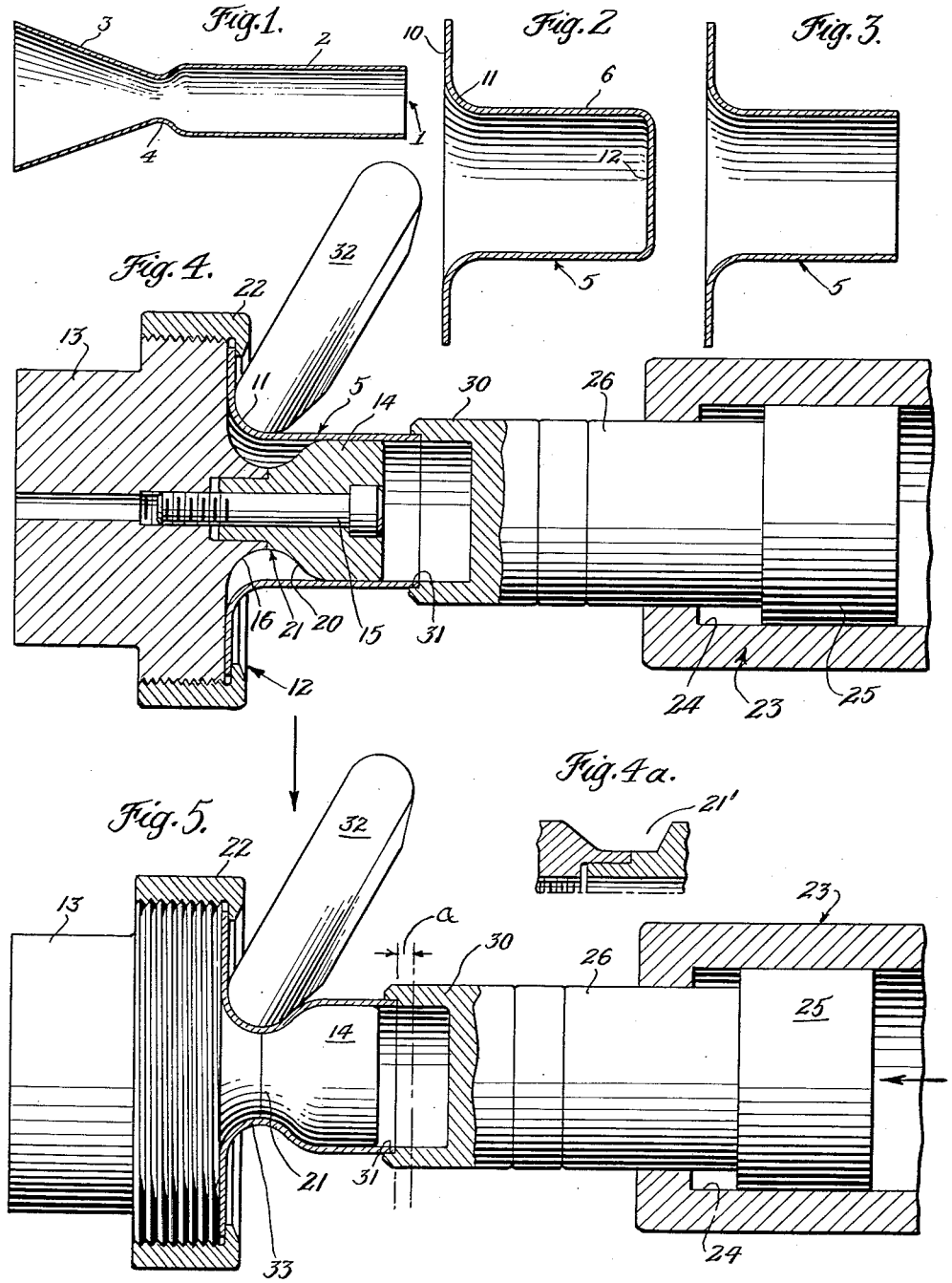

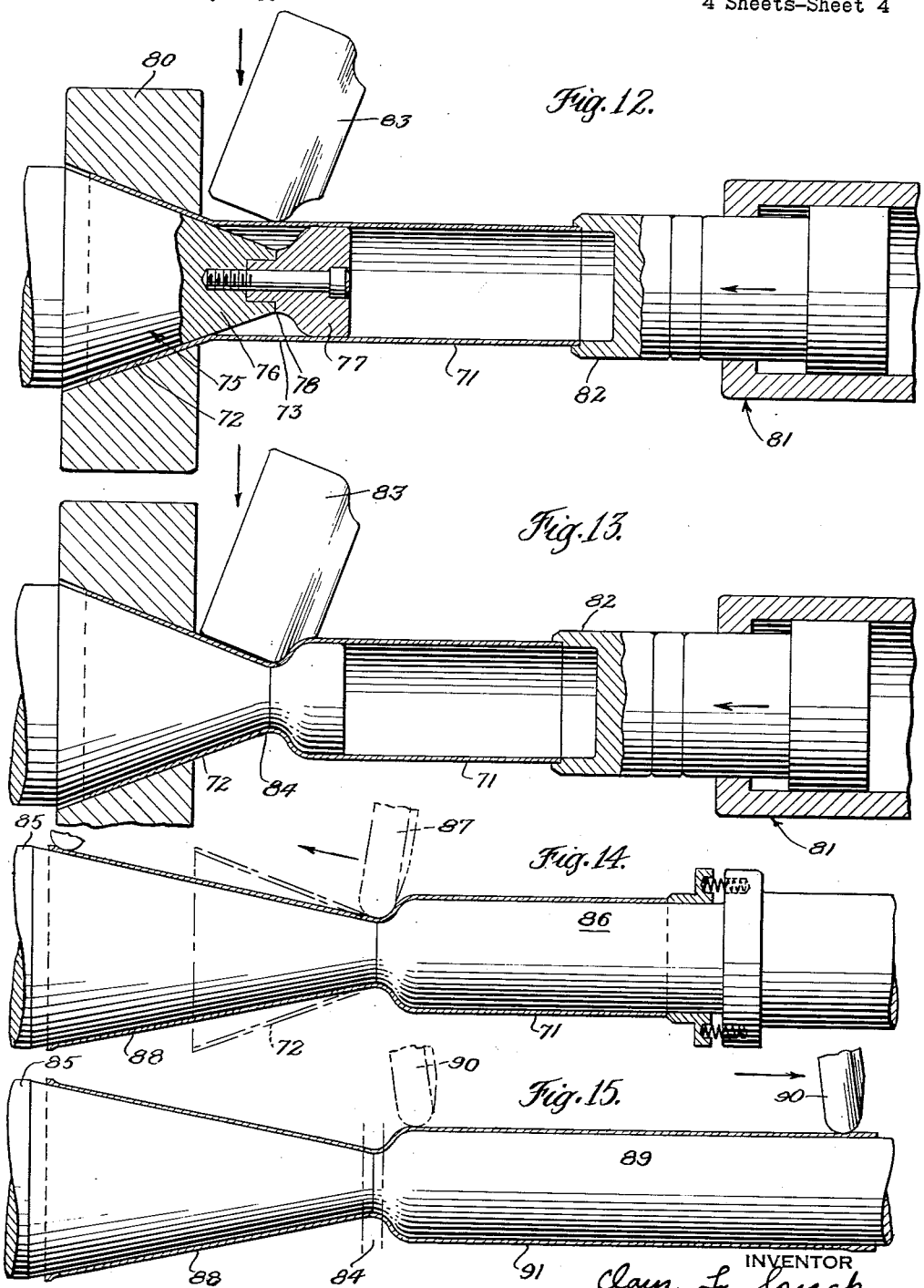

United States Patent Office 3,120,206
Patented Feb. 4, 1964

3,120,206
METAL WORKING
Claus L. Sporck, Cincinnati, Ohio, assignor to The Lodge & Shipley Company, Cincinnati, Ohio, a corporation of Ohio
Filed Mar. 9, 1959, Ser. No. 797,905
2 Claims. (Cl. 113—52)

This invention relates to methods for sheet metal working and in particular relates to methods for working sheet metal blanks into venturi-shaped articles.

The term "venturi" will be understood to mean a hollow article which has two outboard sections together with an inboard or throat section therebetween. One or the other or both of the outboard sections may be conical or tubular in form and the diameter of the inboard section is smaller than those of the outboard sections.

The methods of the invention have particular utility in the manufacture of a wide variety of articles for industrial application, for example, as a part of a so-called venturi meter for measuring pressure, flow or the like of gases or liquids being conducted through pipes. Further, the methods of the invention are highly desirable for use in the manufacture of articles for the ordnance field, for example, parts for guided missiles and rockets, such as hot nozzles and thrust chambers.

Certain desired characteristics of ordnance type articles of the kind mentioned are: a high degree of dimensional accuracy and stability; very high strength; and a small weight-to-size ratio. Also, it is important in certain instances that such articles be formed of one of the so-called exotic metals, such as titanium, molybdenum, stainless steel and the like.

For making articles of the kind in question, conventional manufacturing methods per se, such as deep drawing, spinning, machining and the like, are not satisfactory, particularly for obtaining the above characteristics nor are the same suitable for use with the exotic metals because of the manufacturing cost, inability to maintain dimensional accuracy and in many cases the impossibility of working. The foregoing may be illustrated by reference to techniques used heretofore for the manufacture of hot nozzles. These nozzles in general comprise two outboard sections, one of which is tubular and the other conical, the two outboard sections being connected together by a reduced diameter throat or inboard section. The conventional manner of making a hot nozzle involves the forming of the tubular outboard section by a drawing or a wrapping and welding operation; the forming of a conical section by a wrapping and welding operation; and the making of a throat section by the usual blanking methods. The three sections are welded together and then the welds machined and/or ground. For maintaining dimensions, it is usually necessary to machine each section. It will be readily apparent that the foregoing involves the use of a variety of special and expensive tools and equipment and has a high incidence of labor cost due to the many time-consuming operations. Furthermore, articles made as described do not have the desired strength and weight-to-size ratio.

With the above in mind then, the principal object of the present invention is to provide methods for the manufacture of venturi-shaped articles which permit the use of a wide variety of exotic metals and result in articles having desired dimensional stability, high strength, lightness in weight and low manufacturing cost.

The preferred methods of carrying out the invention will be apparent from the following description and drawings wherein:

FIGURE 1 is an elevational view of a typical venturi-shaped article made in accordance with the methods of the invention;

FIGURE 2 is a sectional elevational view showing the general shape of a blank to be formed into a venturi-shaped article;

FIGURE 3 is a sectional elevational view showing the blank of FIGURE 2 with one end removed;

FIGURE 4 is an elevational view partially in section showing the blank of FIGURE 3 in condition for forming of the inboard or throat section;

FIGURE 4a is a fragmentary view of a modification of certain of the parts of FIGURE 4;

FIGURE 5 is an elevational view partially in section showing the blank of FIGURE 4 after the inboard or throat section has been formed;

FIGURE 6 is an elevational view partially in section showing the blank of FIGURE 6 in condition for forming one of the outboard sections;

FIGURE 7 is an elevational view partially in section showing the blank of FIGURE 6 after the outboard section has been formed;

FIGURE 8 is a view of the blank of FIGURE 7 showing the same after the other outboard section has been formed;

FIGURE 9 is a sectional elevational view showing the general shapes of blanks to be subsequently formed into venturi-shaped articles;

FIGURE 10 is an elevational view partially in section showing the blank of FIGURE 9 in position to be worked into a desired shape;

FIGURE 11 is an elevational view partially in section showing the blank of FIGURE 10 after it has been further shaped;

FIGURE 12 is an elevational view partially in section showing the blank of FIGURE 11 in condition for forming of the inboard or throat section;

FIGURE 13 is an elevational view partially in section showing the blank of FIGURE 12 after the inboard section has been formed;

FIGURE 14 is an elevational view partially in section showing the manner in which the blank of FIGURE 13 is worked for the forming of one of the outboard sections; and FIGURE 15 is an elevational view partially in section showing the worked blank of FIGURE 14 after the other outboard section has been formed.

In FIGURE 1 the venturi-shaped article 1 comprises a tubular-shaped outboard section 2, a conical-shaped outboard section 3 and an inboard or throat section 4, the diameter of which is smaller than either of the outboard sections.

In FIGURE 2 I have shown a hat-shaped blank 5 which has been formed from a substantially flat blank by say a conventional deep drawing operation. The blank of FIGURE 2 comprises a tubular-shaped part 6 and a flared-out part 10 which is generally disk-like in form. The parts 6 and 10 are integrally joined together, the joinder area being indicated at 11. After the blank of FIGURE 2 has been formed as indicated, the closed end 12 is cut off so that the blank has the form as shown in FIGURE 3.

In FIGURE 4 I have illustrated certain equipment or tooling, the use of which is important in the forming of the throat section of the blank. This equipment comprises a spindle or mandrel 12 having the parts 13 and 14 which are fastend together as by the bolt 15. The part 13 has an annular contoured portion 16 and the part 14 has an annular contoured portion 20. These two portions abut one another to form a continuous concave surface 21. As indicated, the blank 5 is held on the mandrel by means of a nut 22 threaded on the part 12. The spindle 13 is adapted to be rotated by means not shown and the rotation of the spindle of course effects rotation of the blank 5. On the right-hand side of FIGURE 5 I have shown a tailstock 23 comprising in general a cylinder 24 carrying a piston 25. The piston 25 is movable back and forth along the rotational axis of the spindle by controlling fluid pressure in the cylinder 24. The piston 25 carries an extension 26 which terminates in a head 30 having a shoulder 31 which in the position shown, engages the end of the blank 5. The head 30 is rotatably mounted on the extension 26 by bearing means not shown so as to be rotatable with the blank 5. The roller 32 is mounted so as to be movable to engage the joinder area 11 of the blank as shown and then to be movable radially inwardly toward the concave surface 21.

It will be noted that the blank 5 is supported so that the joinder area 11 is disposed over the concave surface 21. Also it is to be observed that the concave surface 21 is, in cross section, comprised of gently sloping portions. However, it will be understood that the concave surface may comprise portions of differing slopes and/or contours, for example, where the concave surface is in the form indicated at 21′ in FIGURE 4a.

For forming the inboard or throat section, the joinder area 11 is necked inwardly and the manner of doing this will next be explained.

The spindle and blank are rotated. Then the roller 32 is moved radially inwardly while at the same time fluid is introduced into the cylinder 24 to move the piston 25 to the left (as viewed in FIGURE 4) so that the head 30 forces or moves the part 6 of the blank toward the joinder area or toward the concave surface 21. The net result of these two simultaneous operations is that the joinder area 11 is moved inwardly until it is in firm engagement with the contoured surface 21. This forms the throat or inboard section 33.

It will be observed in the above operation that the part 10 of the blank is held fixed by means of the nut 22 and that the metal for forming the section 33 is supplied, so to speak, by the axial movement of the part 6 of the blank. The blank of course is foreshortened as will be seen from a comparison of FIGURES 4 and 5, the amount of foreshortening being indicated in FIGURE 5 by the distance $a$ between the two parallel dotted lines.

The axial movement of the part 6 of the blank and the radial movement of the part 11 are important because the forming is accomplished without a stretching effect and a consequent reduction in wall thickness of the joinder area 11 and/or of the parts 6 and 10. This permits the inside diameter of the inboard section and its wall thickness to be very accurately controlled. Such control may be effected by desirably correlating the rate of radial movement of the roller 32 and the rate of axial movement of the head 30.

After the blank has been necked as described above, the flared-out section 10 is axially displaced so as to form one of the conical-shaped outboard sections. This will next be explained.

In FIGURES 6 and 7 I have shown certain equipment for use in forming the outboard section and this comprises a conical-shaped spindle or mandrel 34, a tailstock 35 having a head 36 which engages the small end of the spindle 34. Both the spindle and tailstock are rotatable. The blank is mounted on the head 36 which is contoured to the shape of the blank (or the same as part 14). The head 36 carries a slidable collar 40 having a plurality of springs 41 which engage with a shoulder 42 on the tailstock and urge the collar to the left against the part 6 of the blank. A roller 43 which is in engagement with the throat 33 is movable along the spindle 34.

With the spindle 34, tailstock 35 and blank rotating, the roller 43 is moved to the left along a path which is parallel to the surface of the spindle to the position shown in FIGURE 7 to axially displace or elongate and reduce the wall of the part 10 so that the same is formed into the conical-shaped outboard section 44. The section 44 conforms to the shape of the spindle.

The term "axially displaced" means in general that the various strata of the wall are all forced to assume positions which are generally parallel to the rotational axis of the spindle and extend (circumferentially) in helix-like form along the axis of the mandrel. The techniques for axial displacement are known and are disclosed in my abandoned application 650,277, filed April 2, 1957, and entitled "Methods for Working Sheet Metal."

The forming of the outboard section 44 by axial displacement is important for several reasons. First of all, it permits a very high degree of dimensional accuracy in that the inside diameter and the wall thickness of the outboard section 44 can be very closely controlled. Furthermore, the cold working and the orientation of the grain structure impart a high degree of strength to the section 44.

Insofar as the wall dimensions of the section 44 are concerned, this may be calculated from the formula $t_1 = t \times \sin x$ where $t_1$ is the original thickness of the blank (FIGURE 6); $t$ is the final thickness (FIGURE 7) and the angle $x$ is one-half the included angle of the cone or the spindle. In the embodiment described above the thickness $t_1$ is the same dimension as the thickness indicated at 45 or the thickness of the inboard section 33.

After the outboard conical-shaped section is formed, the part 6 of the blank is worked so as to form the tubular outboard section. This is explained in connection with FIGURE 8 wherein it will be seen that the tailstock 35 of FIGURES 6 and 7 has been replaced with a rotatable, cylindrically-shaped spindle or mandrel 46 butted up against the spindle 34. The left-hand end of the spindle 46 is contoured to conform to the shape of the inboard section 33 and the outside diameter of the spindle 46 conforms to the desired inside diameter of the tubular outboard section to be formed. A roller 50 is brought up to engage the blank at the point 51. Then, with the spindle and blank rotating, the roller is moved (to the right) parallel to the surface of the spindle 46 to the position indicated by the full lines to form the other outboard section 53. The roller is spaced from the surface of the spindle 46 a distance equal to the desired wall thickness of the outboard section 53. The spacing is less than the wall thickness of part 6 so that the effect of the roller action is to reduce and elongate the part 6 into the section 53. The section 53 conforms to the surface of the spindle 46 so that the inside diameter is accurately maintained. Wall thickness is controlled by the spacing of the roller 50 from the surface of the spindle 46. Furthermore, the cold working imparts a high degree of strength to the section 53.

In FIGURE 8 the inboard section 33 is indicated as lying generally between the dot-dashed lines. It will be noted that any of the diameters or the mean diameter of the inboard section is less than any of the diameters of either outboard section.

With the completion of the above operation the venturi-type article is formed and ready for any subsequent operations needed for adapting the same to the rocket, missile or other structure with which the article is to be used.

A modification of the method described above for forming venturi-type objects will be explained in connection with FIGURES 9–15.

In FIGURE 9 I have shown a generally conical-shaped blank 60 which has been formed from a flat blank indicated by the dotted lines 61a or a cup-shaped blank indicated by the dotted lines 62a. The techniques for calculating angle, dimension, wall thickness, etc., may be had with reference to application 650,277. Suffice it to say at this point that where a flat blank such as 61a is used, the final wall thickness may be calculated in accordance with the formula $t_1 = t \times \sin x$ mentioned above, and where the cup-shaped blank is used the final wall thickness may be calculated in accordance with the formula $$T_1 = T_2 \times \frac{\sin \alpha}{\sin \beta}$$

where $T_1$ is the thickness of the wall of the original blank; $T_2$ is the thickness of the finished cone; angle $\beta$ is one-half the included angle of the conical part of the blank; and angle $\alpha$ is one-half the included angle of the spindle or finished cone.

The forming of a conical-shaped blank as above mentioned has the same advantages with respect to dimensional accuracy and strength as pointed out in connection with the forming of the conical outboard section 44 (FIGURES 7 and 8).

After the blank 60 is formed, it is then shaped into a blank having a tubular-shaped part and an outwardly flared part. The manner in which this is done will be explained following.

In FIGURE 10 I have illustrated equipment for use in forming the above-mentioned part. Equipment of this type is disclosed in my copending application Serial No. 798,033 filed concurrently herewith and entitled "Metal Working." For details of construction and utilization, reference may be had to that application. For present purposes, the following explanation will suffice. A pair of mating conical forming tools 61 and 62 are arranged so as to support the blank 60 in the position shown. Within the tool 62 there is a cylindrically-shaped movable tool 63 which is mounted for back and forth axial movement. The head 64 of the tool is shaped to conform to the narrow end of the blank 60. As will be apparent, the small end of the blank 60 and the head 64 extend through an aperture 65 in the tool 61.

With the blank in the position shown and the tools 61 and 62 held fixed, the tool 63 is moved axially to the right. The effect of this motion is to move the blank 60 through the tools 61 and 62 and the aperture 65 and the outer surface of the plunger 63. This causes the blank to conform to the shape of the plunger 63. In this instance, the blank assumes a tubular-shape as indicated by 71. The movement of the tool 63 is stopped as indicated in FIGURE 11 so that the blank is not wholly tubular, there remaining the flared-out part 72 which, in this instance, is conical in shape. The two parts 71 and 72 are integrally joined together, the joinder area being indicated by 73.

The above-described manner of forming has several important advantages. First of all, it will be recalled that the blank 60 of FIGURE 9 posessed certain desirable strength and dimensional characteristics. When this blank is formed by the tools as described, these same characteristics are, to a large extent, preserved. Thus the parts 71, 72 and 73 of the blank of FIGURE 11 have the desirable dimensional stability and high strength characteristics.

After the blank of FIGURE 11 is formed, the end of the part 71 is removed at the point indicated by the dot-dash line 74. Then the blank is worked to form the throat or outboard section of the ultimately desired venturi-shaped article. For forming the throat section the joinder area 73 is worked similarly as explained in connection with FIGURES 4 and 5. The manner of doing this is explained following.

In FIGURE 12 a conical-shaped spindle 75 has a member 76 shaped to the part 72 and has secured thereto a member 77. The members 76 and 77 engage one another and form a continuous generally concave surface 78. A nut 80 holds the part 72 of the blank on the member 76 and the part 71 of the blank is supported by the member 77. It will be noted that the blank is supported so that the joinder area 73 is disposed over the concave surface 78.

On the right-hand side a tailstock 81 having the same construction as the tailstock 23 of FIGURE 4 is shown to have its head 82 in engagement with the end of the blank. A roller 83 having the desired contour is moved into the position shown.

For the necking operation the roller 83 is moved radially inwardly and the head 82 moved to the left so that the joinder area 73 is moved into engagement with the concave surface 78 to form inboard section 84 as shown in FIGURE 13.

After the necking operation the blank is removed and placed on the rotatable spindle 85 and tailstock 86 shown in FIGURE 14 which are similar to the spindle and tailstock described in connection with FIGURE 6. The part 72 of the blank is axially displaced by the roller 87 which elongates and reduces the wall of the part to form the outboard section 88. The wall thickness of the section 88 is calculated in accordance with the formula $$T_1 = T_2 \times \frac{\sine \alpha}{\sine \beta}$$

mentioned above.

After the outboard section 88 is formed, the tailstock 86 is removed and replaced by the spindle 89 which is similar to spindle 46 described in connection with FIGURE 8. A roller 90 is moved parallel to spindle 89 as shown to reduce and elongate the part 71 of the blank to form the other outboard section 91.

In FIGURE 15 the inboard section 84 is shown as lying generally between the dot-dashed lines. It will be noted that any of the diameters or the mean diameter of the inboard section is less than any of the diameters of either outboard section.

As will be apparent, the part 72 of the blank is formed with an included angle which is somewhat larger than the included angle of the section 88 of the finished article. This is important for several reasons. For example, it will be recalled that the part 72 of the blank formed in FIGURE 11 retained the dimensional and high strength characteristics of the original blank 60. By the operation of FIGURE 14 this part 72 is again axially displaced to form the part 88, the effect of which is to impart further high strength characteristics. The same applies to the part 71 of the blank of FIGURE 11 which in FIGURE 15 is again cold worked which improves the strength characteristics.

In connection with the necking operation of FIGURES 12 and 13, it is pointed out that the high strength characteristics of the joinder section 73 of the blank in FIGURE 11 is not impaired, principally because there is no stretching of the joinder section due to the fact that the metal is fed axially by the operation of the tailstock 81.

I claim:

1. The method of forming a hollow, elongated article having two outboard sections and an inboard section therebetween, the inboard section being of smaller diameter than either of the outboard sections, comprising the steps; forming a hollow blank having two integrally-joined parts, one of the parts being flared outwardly in disk-like form and the other being tubular in form; inwardly necking the area joining the two parts to form said inboard section; reducing the thickness and increasing the length of said flared part to form one of said outboard sections; and reducing the thickness and increasing the length of said tubular part to form the other of said outboard sections.

2. The method of forming a hollow, elongated article having two outboard sections and an inboard section therebetween, the inboard section being of smaller diameter than either of the outboard sections, comprising the steps of: forming a blank having two integrally-joined parts, one of the parts being flared outwardly in disk-like form and the other being tubular in form; supporting the blank on a pair of contoured spindles engaging one another to form a continuous concave surface, the blank being supported on the spindles so that the joinder area of the two parts surrounds said concave surface; while rotating the blank and spindles, causing a tool engaged with one of said parts to move the part in a direction toward said concave surface and simultaneously causing a roller engaged with the joinder area to move radially inwardly to force the joinder area against said concave surface whereby to form said inboard section; supporting the blank on spindle means and while rotating the blank and spindle means, causing a roller engaged with one of said parts adjacent said inboard section to move along the spindle surface to reduce the thickness and increase the length of the part to form one of said outboard sections; and supporting the blank on spindle means and while rotating the blank and spindle means causing a roller engaged with the other of said parts adjacent said inboard section to move along the spindle surface to reduce the thickness and increase the length of the part to form the other of said outboard sections.

References Cited in the file of this patent

UNITED STATES PATENTS

| | | |
|---|---|---|
| 899,762 | Richards | Sept. 29, 1908 |
| 1,939,356 | Lindgren | Dec. 12, 1933 |
| 1,968,296 | Hiester | July 31, 1934 |
| 2,339,763 | Calleson et al. | Jan. 25, 1944 |
| 2,522,257 | Curtis | Sept. 12, 1950 |
| 2,921,549 | Schwenk | Jan. 19, 1960 |
| 2,932,890 | Sporck et al. | Apr. 19, 1960 |

FOREIGN PATENTS

| | | |
|---|---|---|
| 8,011 | England | of 1908 |
| 286,790 | England | Mar. 12, 1928 |

OTHER REFERENCES

American Machinist, Mar. 24, 1958, page 108, McGraw-Hill Publishing Co., 330 West 42nd St., New York 26, N.Y. A copy of the American Machinist article may be found in Patent Office Scientific Library or in Div. 14 of the Patent Office.